(12) United States Patent
Lee et al.

(10) Patent No.: US 11,869,162 B2
(45) Date of Patent: Jan. 9, 2024

(54) APPARATUS AND METHOD WITH VIRTUAL CONTENT ADJUSTMENT

(71) Applicant: SAMSUNG ELECTRONICS CO., LTD., Suwon-si (KR)

(72) Inventors: Heesae Lee, Ansan-si (KR); Hyun Sung Chang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/140,777

(22) Filed: Jan. 4, 2021

(65) Prior Publication Data

US 2022/0058885 A1 Feb. 24, 2022

(30) Foreign Application Priority Data

Aug. 18, 2020 (KR) .......................... 10-2020-0103404

(51) Int. Cl.
| | |
|---|---|
| *G06T 19/20* | (2011.01) |
| *B60K 35/00* | (2006.01) |
| *G02B 27/01* | (2006.01) |
| *G06F 3/01* | (2006.01) |
| *G06T 19/00* | (2011.01) |

(52) U.S. Cl.
CPC .............. *G06T 19/20* (2013.01); *B60K 35/00* (2013.01); *G02B 27/0101* (2013.01); *G02B 27/0172* (2013.01); *G06F 3/013* (2013.01); *G06T 19/006* (2013.01); *B60K 2370/149* (2019.05); *B60K 2370/1529* (2019.05); *B60K 2370/177* (2019.05); *G02B 2027/014* (2013.01); *G02B 2027/0178* (2013.01); *G06T 2219/2016* (2013.01); *G06T 2219/2021* (2013.01)

(58) Field of Classification Search
None
See application file for complete search history.

(56) References Cited

U.S. PATENT DOCUMENTS

| | | | |
|---|---|---|---|
| 10,282,915 B1 * | 5/2019 | Lin .......................... | G06T 17/00 |
| 10,549,638 B2 | 2/2020 | Suzuki et al. | |
| 10,573,063 B2 | 2/2020 | Cho et al. | |
| 2008/0100614 A1 * | 5/2008 | Augst .................... | G06T 19/006 |
| | | | 345/419 |
| 2008/0195315 A1 * | 8/2008 | Hu ........................ | G08G 1/0969 |
| | | | 701/455 |
| 2010/0085170 A1 * | 4/2010 | Oleg ........................ | G06T 11/00 |
| | | | 340/425.5 |
| 2012/0008048 A1 * | 1/2012 | Sekine .................. | G01C 21/365 |
| | | | 348/565 |

(Continued)

FOREIGN PATENT DOCUMENTS

| | | |
|---|---|---|
| DE | 10 2016 215 519 A1 | 2/2018 |
| DE | 11 2018 003 345 T5 | 3/2020 |

(Continued)

OTHER PUBLICATIONS

European Search Report issued by the EPO on Sep. 3, 2021 in counterpart EP Application No. 21157646.7 (7 pages in English).

*Primary Examiner* — Jason A Pringle-Parker
(74) *Attorney, Agent, or Firm* — NSIP Law

(57) ABSTRACT

A processor-implemented method includes: adjusting a virtual content object based on a shape of the virtual content object projected onto a projection plane; and visualizing the adjusted virtual content object on the projection plane.

30 Claims, 14 Drawing Sheets

(56) References Cited

U.S. PATENT DOCUMENTS

| | | | |
|---|---|---|---|
| 2013/0293582 A1* | 11/2013 | Ng-Thow-Hing | G01C 21/365 345/633 |
| 2014/0043322 A1* | 2/2014 | Fulks | G06T 19/006 345/419 |
| 2015/0204687 A1* | 7/2015 | Yoon | G06T 19/006 701/436 |
| 2016/0163109 A1* | 6/2016 | Kobayashi | G02B 27/0172 345/633 |
| 2016/0170487 A1* | 6/2016 | Saisho | B60K 35/00 345/156 |
| 2016/0231570 A1* | 8/2016 | Levola | G02B 6/0035 |
| 2017/0084081 A1* | 3/2017 | Ishihara | G06T 7/536 |
| 2017/0140457 A1* | 5/2017 | Kaku | G06T 19/006 |
| 2017/0161009 A1* | 6/2017 | Ogisu | G06F 3/1446 |
| 2017/0336222 A1* | 11/2017 | Yamaguchi | B60K 35/00 |
| 2018/0204365 A1* | 7/2018 | Lee | G06T 7/55 |
| 2018/0218713 A1* | 8/2018 | Kusanagi | G06T 11/60 |
| 2018/0330539 A1* | 11/2018 | Katagiri | G06T 19/006 |
| 2019/0025580 A1 | 1/2019 | Nagano et al. | |
| 2019/0035157 A1* | 1/2019 | Chung | G02B 27/0101 |
| 2019/0049724 A1* | 2/2019 | Kimura | G06V 20/588 |
| 2019/0244587 A1 | 8/2019 | Hada et al. | |
| 2019/0271840 A1* | 9/2019 | Kishigami | G02B 27/0101 |
| 2019/0316928 A1 | 10/2019 | Bagschik et al. | |
| 2020/0116518 A1 | 4/2020 | Lee | |

FOREIGN PATENT DOCUMENTS

| | | |
|---|---|---|
| JP | 2019-032243 A | 2/2019 |
| JP | 2019-038342 A | 3/2019 |
| JP | 2019-098791 A | 6/2019 |
| KR | 10-0721560 B1 | 5/2007 |
| KR | 10-1921969 B1 | 8/2013 |
| KR | 10-1855940 B1 | 5/2017 |
| KR | 10-2017-0133747 A | 12/2017 |
| KR | 10-2018-0084534 A | 7/2018 |
| KR | 10-2019-0052374 A | 5/2019 |
| KR | 10-2019-0070665 A | 6/2019 |

* cited by examiner

APPARATUS AND METHOD WITH VIRTUAL CONTENT ADJUSTMENT

CROSS-REFERENCE TO RELATED APPLICATIONS

This application claims the benefit under 35 USC § 119(a) of Korean Patent Application No. 10-2020-0103404 filed on Aug. 18, 2020 in the Korean Intellectual Property Office, the entire disclosure of which is incorporated herein by reference for all purposes.

BACKGROUND

1. Field

The following description relates to technology of visualizing content.

2. Description of Related Art

Augmented reality (AR) representing a variety of visual information may be provided through displays or navigation systems mounted on vehicles and other transportation means to assist driving of the vehicles and other transportation means. For example, efforts have been made to display driving information through an AR-based head-up display (HUD).

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented method includes: adjusting a virtual content object based on a shape of the virtual content object projected onto a projection plane; and visualizing the adjusted virtual content object on the projection plane.

The adjusting of the virtual content object may include: setting one of points belonging to a space corresponding to the virtual content object as a reference point; and changing the virtual content object based on the set reference point.

The changing of the virtual content object may include extending the shape of the virtual content object along a direction axis oriented from a user toward the reference point.

The changing of the virtual content object may include: setting a reference axis perpendicular to a direction axis oriented from a user toward the reference point, at the reference point; and rotating the virtual content object based on the reference axis.

The setting of the one of the points as the reference point may include determining one of points at which a direction axis parallel to a reference plane and oriented from a user toward the virtual content object passes through the virtual content object as the reference point.

The setting of the one of the points as the reference point may include selecting the one of the points based on a distance between a viewpoint of a user and physical positions of the points.

The selecting of the one of the points may include determining a point closest to the viewpoint of the user among the points as the reference point.

The adjusting of the virtual content object may include changing the virtual content object based on a height-to-width (h/w) ratio of the shape of the virtual content object projected onto the projection plane.

The changing of the virtual content object may include fitting the h/w ratio to a target ratio designated for a reference distance.

The changing of the virtual content object may include: calculating a height of the virtual content object based on a position of a proximal point closest to a viewpoint on the projection plane and a position of a distal point farthest from the viewpoint on the projection plane among points belonging to a space corresponding to the virtual content object; and calculating a width of the virtual content object along a reference axis.

The visualizing of the adjusted virtual content object may include disposing a lower end portion of the virtual content object on a reference plane and visualizing the virtual content object with the lower end portion disposed on the reference plane.

The reference plane may correspond to a bottom surface of an object disposition space in which the virtual content object is visualized.

The adjusting of the virtual content object may include: setting a first reference point and a first reference axis in a first graphic object corresponding to a left image; adjusting the first graphic object based on the first reference point and the first reference axis; setting a second reference point and a second reference axis in a second graphic object corresponding to a right image; and adjusting the second graphic object based on the second reference point and the second reference axis.

The visualizing of the adjusted virtual content object may include providing the adjusted first reference point to a left eye of a user and providing the adjusted second reference point to a right eye of the user.

The adjusting of the virtual content object may include changing the shape of the virtual content object in response to a movement of a viewpoint of a user being detected.

The adjusting of the virtual content object may include: reducing a length of the virtual content object along a direction axis parallel to a reference plane and oriented from a user toward a reference point, in response to a distance between a viewpoint of the user and a physical position of the virtual content object decreasing; or increasing the length of the virtual content object along the direction axis parallel to the reference plane and oriented from the user toward the reference point, in response to the distance between the viewpoint of the user and the physical position of the virtual content object increasing.

The adjusting of the virtual content object may include: reducing an angle between a reference plane and a bottom surface of the virtual content object based on a reference axis, in response to a distance between a viewpoint of a user and a physical position of the virtual content object decreasing; or increasing the angle between the reference plane and the bottom surface of the virtual content object based on the reference axis, in response to the distance between the viewpoint of the user and the physical position of the virtual content object increasing.

The visualizing of the adjusted virtual content object may include overlaying the adjusted virtual content object over a real environment while visualizing the adjusted virtual content object on a projection plane, by a display of an augmented reality (AR) glasses apparatus.

The visualizing of the adjusted virtual content object may include visualizing the adjusted virtual content object on the projection plane, by a head-up display (HUD) of a vehicle.

In another general aspect, a non-transitory computer-readable storage medium stores instructions that, when executed by a processor, cause the processor to perform the method described above.

In another general aspect, an apparatus with content visualizing includes: a processor configured to adjust a virtual content object based on a shape of the virtual content object projected onto a projection plane; and a display configured to visualize the adjusted virtual content object on the projection plane.

The display may be an augmented reality (AR) glasses display.

The display may be a head-up display (HUD) of a vehicle.

The processor may be further configured to retrieve the virtual content object from among a plurality of candidate objects stored in memory, based on the projection plane and a field of view of a viewpoint of a user of the apparatus.

The processor may be further configured to retrieve the virtual content object from among a plurality of candidate objects stored in memory, based on a position of the apparatus.

In another general aspect, an augmented reality (AR) glasses apparatus includes: a processor configured to adjust a virtual content object based on a shape of the virtual content object projected onto a projection plane; and a transparent display configured to provide the adjusted virtual content object by overlaying the adjusted virtual content object over a real environment while visualizing the adjusted virtual content object on the projection plane.

In another general aspect, a vehicle includes: a sensor configured to sense a position of the vehicle; a processor configured to determine a virtual content object to be provided to a user based on the position of the vehicle, and adjust the virtual content object based on a shape of the virtual content object projected onto a projection plane; and a head-up display (HUD) configured to visualize the adjusted virtual content object on the projection plane.

Other features and aspects will be apparent from the following detailed description, the drawings, and the claims.

Figure 1:
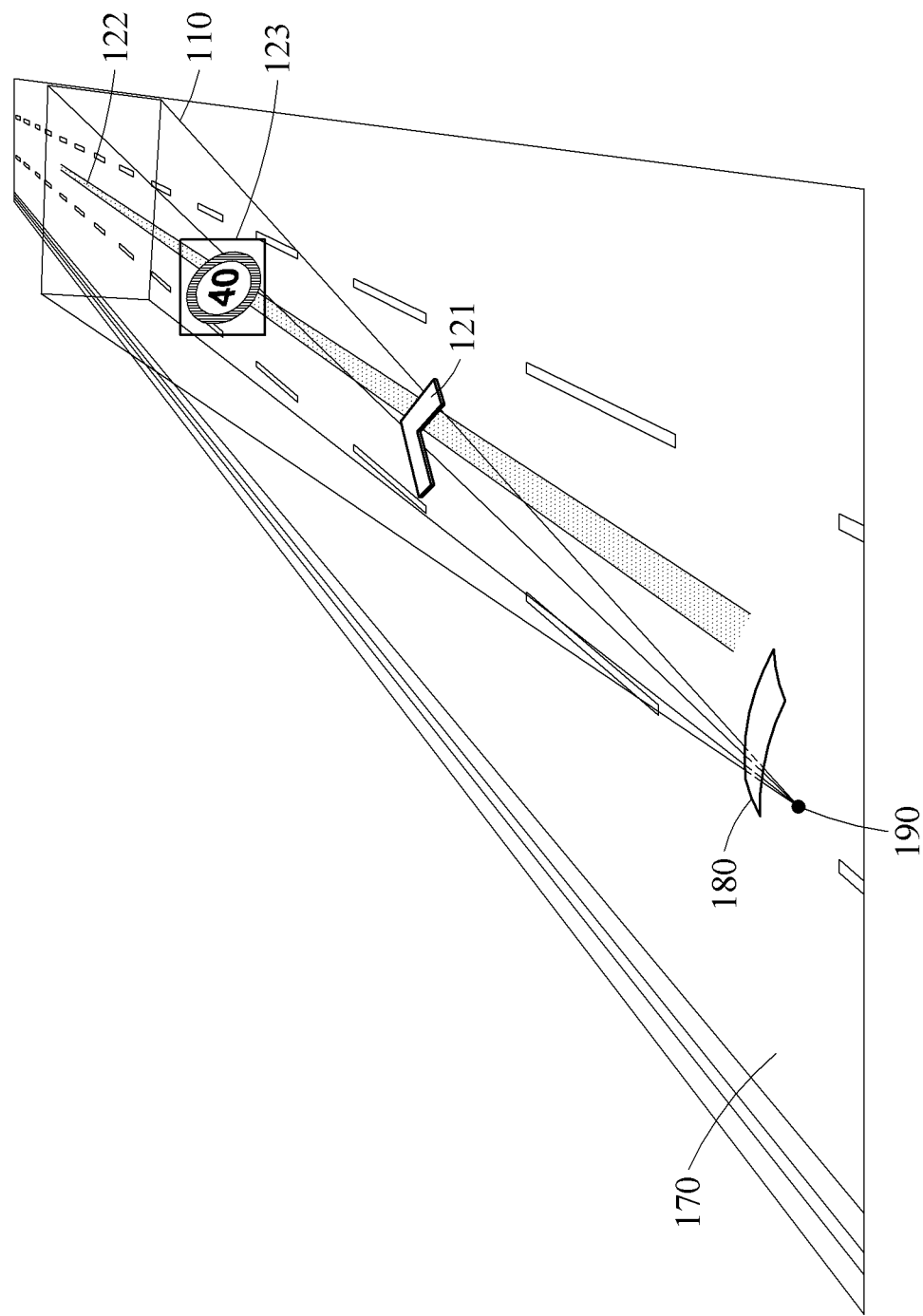
FIG. 1 illustrates an example of visualized content.

Throughout the drawings and the detailed description, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is noted that use of the term "may" with respect to an embodiment or example, e.g., as to what an embodiment or example may include or implement, means that at least one embodiment or example exists in which such a feature is included or implemented while all examples and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after gaining an understanding of the disclosure of this application. Further, although the examples described herein have a variety of configurations, other configurations are possible as will be apparent after an understanding of the disclosure of this application.

Unless otherwise defined, all terms including technical and scientific terms used herein have the same meaning as commonly in the art to which the disclosure is related. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

When describing the examples with reference to the accompanying drawings, like reference numerals refer to like constituent elements and a repeated description related thereto may be omitted. In the description of examples, detailed description of well-known related structures or functions may be omitted when such description may cause ambiguous interpretation of the disclosure.

FIG. 1 illustrates an example of visualized content.

Referring to FIG. 1, an apparatus with content visualizing (hereinafter, "content visualizing apparatus") may visualize a virtual content object. The virtual content object may represent a graphic object corresponding to content. The virtual content object may include, for example, a graphic object corresponding to route guidance content 121.

For example, the content visualizing apparatus may dispose and visualize the graphic object at an arbitrary position in an object disposition space 110. The content visualizing apparatus may stereoscopically provide the graphic object by presenting a left image and a right image to a left eye of a user and a right eye of the user, respectively. The left image and the right image may include respective graphic objects spaced apart from each other by a distance corresponding to a disparity in depth along a horizontal axis. Thus, a user may recognize a depth of a stereoscopically rendered graphic object.

The object disposition space 110 may be a three-dimensional (3D) space where a graphic object is to be disposed. In an example, the object disposition space 110 may be a space in which a graphic object having a depth is stereoscopically visualized. Coordinates of each point belonging to the object disposition space 110 may be mapped in a scale identical or similar to that of geographic coordinates of a physical world. A boundary of the object disposition space 110 may be determined based on a structure of a head-up display (HUD). For example, the content visualizing apparatus may visualize the graphic object in a space between a minimum depth, for example, a minimum distance, and a maximum depth, for example, a maximum distance. The minimum depth and the maximum depth may be determined based on the structure of the HUD.

The object disposition space 110 may be determined based on a space corresponding to a view of the user. A shape and a size of the object disposition space 110 may be determined based on a size of an eye box 190 and a field of view (FOV) that may be provided by the HUD. For example, the object disposition space 110 may be a space provided in a shape of a rectangular cone which extends from the eye box 190 to correspond to the FOV. The eye box 190 may be a region set such that both eyes of the user are positioned therein. A position of the eye box 190 may be fixed, however, examples are not limited thereto. For example, the position of the eye box 190 may change based on a detected position of an eye of the user. Also, examples are not limited to the shape of the rectangular cone, and the shape of the object disposition space 110 may vary depending on a design.

The content visualizing apparatus may be implemented to visualize various types of graphic representations at display positions in the object disposition space 110 over a windshield 180, and to visualize different types of graphic representations in different object disposition spaces 110.

The types of graphic representations to be displayed in the object disposition space 110 may include, for example, the route guidance content 121, a path indicating line 122, and warning content 123. In addition, the types of graphic representations to be displayed in the object disposition space 110 may be modified, and other types of graphic representations may be used without departing from the spirit and scope of the illustrative examples described herein.

The user may recognize the corresponding graphic representations as being present at physical positions corresponding to the display positions in the object disposition space 110. As described above, every coordinate in the object disposition space 110 may be mapped to a single physical coordinate. Also, the virtual content object may occupy a space corresponding to a shape. For example, the virtual content object may occupy a portion of the object disposition space 110.

The route guidance content 121 may be content with visualized route guidance information that needs to be provided for traveling along a route to a destination. The route guidance content 121 may include, for example, numbers and letters indicating the distance that a user needs to go straight, arrows indicating turns (e.g., a left turn and a right turn) to make at an intersection, a speed limit on a road 170 on which a vehicle is currently traveling, and a road name or an area name of a position in which the vehicle is currently traveling. Route guidance information may be information which guides the user to travel based on a route set by the user and information associated with the route. The route guidance information may include, for example, a distance that the user needs to go straight, and a turn to make at an intersection. The route may be a path that the user needs to travel along from a point of departure to reach a destination. Also, the route guidance information may be information associated with a route to a destination, and may include, for example, a location, an area, a name, an attribute, and safety information (for example, a speed limit, construction information, or accident information) of the road 170 included in the route. The path indicating line 122 may be a line indicating a path to a destination, and may be visualized as route guidance information in a form different from that of the route guidance content 121. The warning content 123 may include a warning message to be provided to the user, as necessary, in a current driving environment.

The content visualizing apparatus may estimate a position of a vehicle using a sensor, for example, a camera sensor, a global navigation satellite system (GNSS) module, a radio detection and ranging (RADAR), or a light detection and ranging (LIDAR). The content visualizing apparatus may visualize the graphic object corresponding to the route guidance content 121 to be matched to a real road, that is, the road 170, in view of an error distance from a position of the vehicle to positions of eyes of a driver. When high definition (HD) map data is used, the content visualizing apparatus may match the route guidance content 121 to a more accurate position. Through such matching, the content visualizing apparatus may improve a psychological stability of the driver.

Although adjustment of the route guidance content 121 is mainly described as an example of visualizing a virtual content object for convenience of description, content visualization is not limited to adjustment of the route guidance content 121. Content visualization may be applicable to all graphic objects visualized in an object disposition space.

Figure 2:
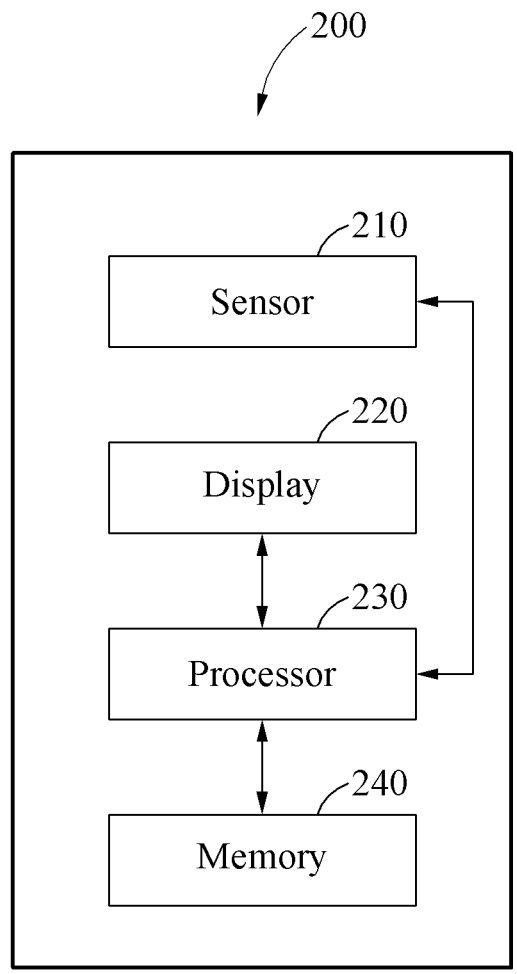
FIG. 2 illustrates an example of a configuration of an apparatus with content visualizing.

FIG. 2 illustrates an example of a configuration of a content visualizing apparatus 200.

Referring to FIG. 2, the content visualizing apparatus 200 may include, for example, a sensor 210, a display 220, a processor 230, and a memory 240.

The sensor 210 may sense information to be used to visualize content. The sensor 210 may measure a distance to an object positioned in a vicinity of a user, and may include, for example, a LIDAR and a RADAR. In an example, the sensor 210 may sense information associated with a state of a device on which the content visualizing apparatus 200 is mounted. For example, when the content visualizing apparatus 200 is mounted on a vehicle, the sensor 210 may sense information associated with the vehicle, and the information associated with the vehicle may include position information of the vehicle, road information corresponding to a position of the vehicle, and driving related information of the vehicle. In an example, the driving related information may be information related to driving of the vehicle, and may include, for example, information related to a speed, an acceleration, a position, fuel, and maintenance of the vehicle. The sensor 210 may include an internal sensor that captures an inside of the vehicle. The internal sensor may include, for example, a camera sensor, such as a color camera, an infrared sensor, a depth sensor, and a thermal imaging sensor. However, the internal sensor is not limited to the foregoing examples. The internal sensor may obtain information associated with eyes of a user in the vehicle, and the processor 230 may determine positions of the eyes and may use the positions of the eyes to set an object disposition space and to visualize a stereoscopic image, for example, a pair of a left image and a right image.

The position information of the vehicle may indicate current coordinates at which the vehicle is positioned, and information about a lane on which the vehicle is currently travelling. In an example, the sensor 210 may obtain two-dimensional (2D) coordinates of the vehicle through a GNSS. Also, the sensor 210 may obtain a front-view image of a view in front of the vehicle, and the processor 230 may determine, from the front-view image, a lane, for example, an ego lane, on which the vehicle is currently travelling among a plurality of lanes of a road. However, the disclosure is not limited to the foregoing examples. The processor 230 may estimate a current position of the vehicle based on images collected from the sensor 210.

The road information may include any one or any combination of any two or more of a width of a road, a number of lanes of the road, a width of each lane, a center line, a turn point, a traffic signal, and other traffic related information.

The display 220 may visualize content and provide the content to the user. The display 220 may visualize an adjusted virtual content object on a projection plane. In an example, the display 220 may be a HUD configured to form a projection plane in front of a user and provide the content to the user through the projection plane. In another example, the display 220 may be a transparent display to provide a virtual content object by overlaying the virtual content object over a real environment in an augmented reality (AR) glasses apparatus.

The display 220 may provide a left image to a left eye of the user and a right image to a right eye of the user. For example, the processor 230 may generate a left image including a first graphic representation corresponding to a left eye of a driver and a right image including a second graphic representation corresponding to a right eye of the driver. The display 220 may provide the left image and the right image so as to have a disparity between the left image and the right image. The display 220 may visualize content having a depth as a stereoscopic graphic object and provide the content to the user by spacing a graphic object with content visualized in the left image and a graphic object with content visualized in the right image from each other based on a binocular disparity. A disparity may be determined for each pixel of a graphic object, and a sense of depth may be expressed for each pixel. In an example, pixels of a graphic object corresponding to a proximal part close to a user may be spaced apart from each other by a relatively large disparity between the left image and the right image. In another example, pixels of a graphic object corresponding to a distal part far from the user may be spaced apart from each other by a relatively small disparity between the left image and the right image.

For example, the display 220 may visualize a graphic object corresponding to route guidance content in a display area determined by the processor 230. Positions of both eyes of a user may be measured by the sensor 210, for example, the internal sensor, and may be provided to the processor 230. The positions of both eyes of the user may be tracked at all times while the vehicle is travelling such that the content may be stereoscopically delivered even when the driver moves the head up, down, to the right, and to the left or adjusts a height of a seat.

The processor 230 may create and adjust content to be visualized through the display 220. The processor 230 may generate an object disposition space based on a road region that is estimated ahead of a vehicle. The processor 230 may render a virtual content object disposed in the object disposition space as being projected onto a projection plane, and may provide the virtual content object to the user through the display 220. The processor 230 may adjust the virtual content object based on a shape of the virtual content object projected onto the projection plane. For example, the processor 230 may deform or rotate the virtual content object based on a reference point and a reference axis. However, an operation of the processor 230 is not limited to the operation described above, and the processor 230 may also perform the above-described operation together with one or more operations that will be described below with reference to FIGS. 3 through 14.

The memory 240 may temporarily or permanently store the information to be used to visualize the content. The memory 240 may store instructions to be executed by the processor 230 to perform the operations that will be described below with reference to FIGS. 3 through 14. Also, the memory 240 may store a virtual content object, route guidance information, and a map database (DB). The map DB may be a DB storing map data. For example, the map DB may store an HD map DB. The HD map DB may include, for example, information related to fine data such as a number of lanes, a width of each lane, and a position of a center line.

The content visualizing apparatus 200 may be implemented as a 3D HUD for a vehicle, or a navigation system indicating a driving route of a vehicle, for example. The content visualizing apparatus 200 may also be implemented to provide AR to a user. For example, the content visualizing apparatus 200 may display content to a depth within a predetermined range, for example, 5 meters (m) to 70 m from the vehicle, beyond a hood of the vehicle. However, an application of the content visualizing apparatus 200 is not limited to the applications described above.

Figure 3:
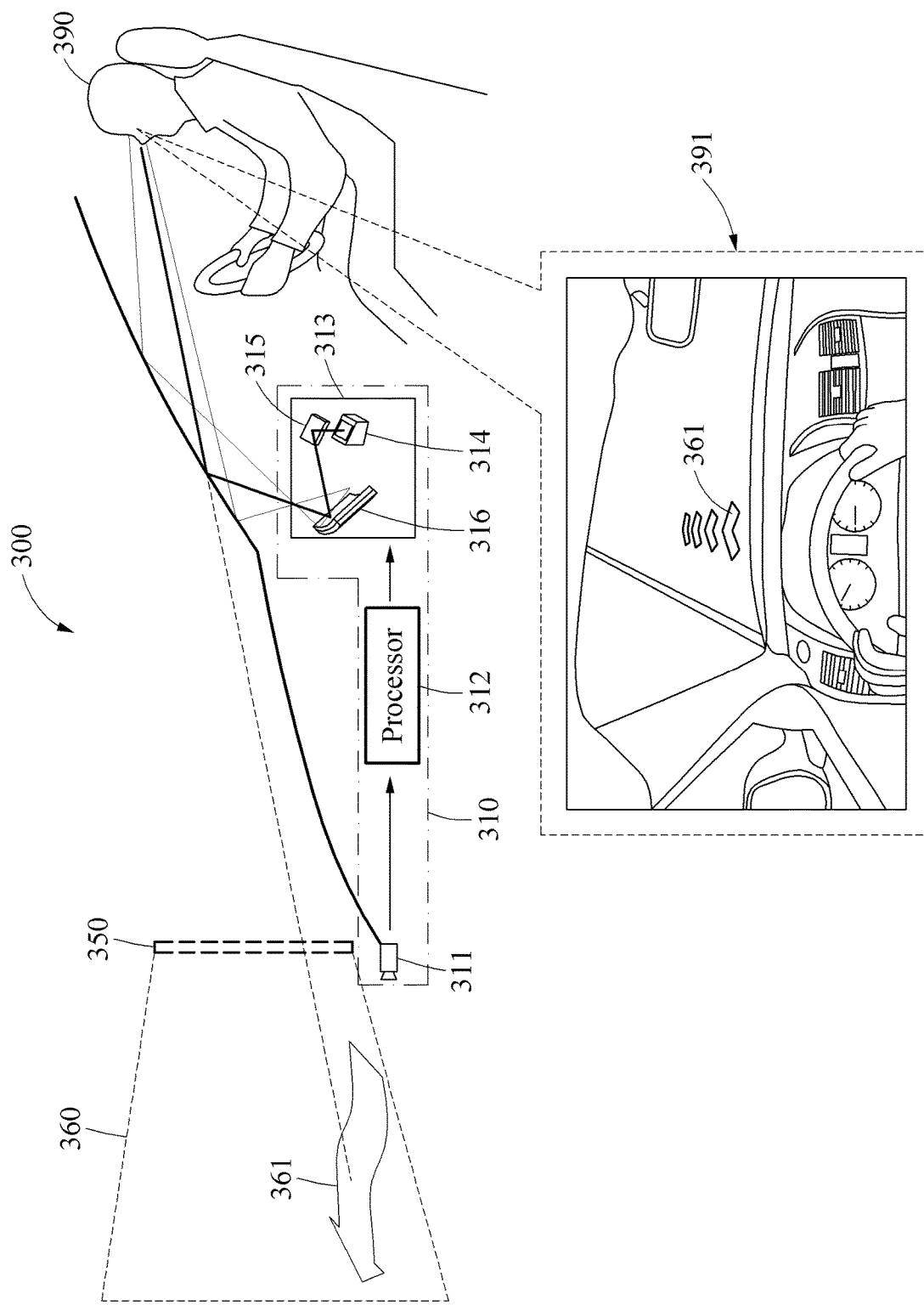
FIG. 3 illustrates an example of a configuration of a head-up display (HUD) of an apparatus with content visualizing.

FIG. 3 illustrates an example of a configuration of a HUD of a content visualizing apparatus 310.

A content visualizing system 300 may be a system that provides a virtual content object 361 to a user 390, and may be, for example, a device on which a content visualizing apparatus 310 is mounted.

The content visualizing apparatus 310 may include, for example, a sensor 311, a processor 312, and a HUD 313.

The sensor 311 may detect an object in front of the content visualizing apparatus 310 (e.g., in front of a vehicle on which the content visualizing apparatus 310 is mounted. The sensor 311 may measure a distance to the object in front of the content visualizing apparatus 310. However, the sensor is not limited to the aforementioned configuration. The sensor 311 may measure a distance to an object in a vicinity of a vehicle, and may generate a vicinity distance map indicating the distance to the object in the vicinity of the vehicle. Also, the sensor 311 may generate images by capturing environments in front, in rear, on left-hand side, and on right-hand side of the vehicle. The sensor 311 may include a module, for example, a GNSS, configured to measure and estimate a position of the content visualizing apparatus 310.

The processor 312 may obtain the virtual content object 361 that is to be provided to the user 390. The virtual content object 361 may be an object to provide information to a user. In an example, the processor 312 may model an object, may detect a position of the object, or may recognize the object by analyzing vicinity information, for example, a distance to an object around and an image including the object, sensed by the sensor 311. In another example, the processor 312 may determine a current position of the content visualizing apparatus 310. The processor 312 may select and load the virtual content object 361 that is to be provided to a user, based on an object disposition space according to an FOV of the HUD 313 and the current position. An example of selecting the virtual content object 361 will be further described below with reference to FIG. 12.

The HUD 313 may visualize the virtual content object 361 in a visible region that is positioned in front of the user 390. For example, the HUD 313 may visualize the virtual content object 361 on a window, for example, a windshield glass of the vehicle, disposed in front of the user 390. The HUD 313 may form a virtual projection plane 350. The projection plane 350 may be a plane on which a virtual image including the virtual content object 361 generated by the HUD 313 is displayed. The user 390 may recognize the virtual image as being displayed on the projection plane 350. The projection plane 350 may be formed in a region observable with eyes of the user 390.

Also, the HUD 313 may visualize the virtual content object 361 having a depth on the projection plane 350. The processor 312 may determine a depth to which the virtual content object 361 is to be visualized based on the projection plane 350 for each pixel of the virtual content object 361, and the HUD 313 may visualize, based on the determined depth, the virtual content object 361 to have a depth which is relatively far away from or close to the projection plane 350 based on the user 390. In other words, a binocular disparity may be determined for each pixel of the virtual content object 361. The HUD 313 may visualize the virtual content object 361 having the corresponding depth in a virtual region 360 on the projection plane 350. The processor 312 may render the virtual content object 361 to be a 3D graphic representation based on an optical system of the HUD 313. The 3D graphic representation may be a stereoscopic graphic representation having a depth, and will be referred to as a graphic object in the following examples. The HUD 313 may form the projection plane 350 displaying a left image and a right image, based on the depth of the virtual content object 361, and may provide the left image to a left eye of the user 390 and the right image to a right eye of the user 390 through the projection plane 350. Thus, the user 390 may recognize a sense of depth of the stereoscopically rendered virtual content object 361.

The HUD 313 may include, for example, a picture generator 314, a fold mirror 315, and a concave mirror 316. However, the configuration of the HUD 313 is not limited to the aforementioned components, and may include various components designed to form the projection plane 350 on which a virtual image is focused through projection toward a window disposed in front of the user 390.

Although an example in which the content visualizing apparatus 310 is mounted on a vehicle is described herein, the disclosure is not limited to such an example. The content visualizing apparatus 310 may be applied to technology that combines information of a real world and information of a virtual world, for example, AR glasses or a mixed reality (MR) device.

In an example, the content visualizing apparatus 310 may continue to express the depth of the virtual content object 361 by adjusting the depth of the virtual content object 361, even though a position of the projection plane 350 formed by the HUD 313 is not changed. Since a change of the position of the projection plane 350 is not needed, the content visualizing apparatus 310 may not require a physical control of components included in the HUD 313. When the content visualizing apparatus 310 is mounted on a vehicle, the content visualizing apparatus 310 may dynamically visualize the 3D virtual content object 361 in front of a driver. As shown in FIG. 3, a scene 391 observed by the user 390 may include the virtual content object 361 that is superimposed on a background and a real physical object, and is visualized.

The content visualizing apparatus 310 may adjust the virtual content object 361 to be visualized more naturally. An operation of the content visualizing apparatus 310 will be further described below.

Figure 4:
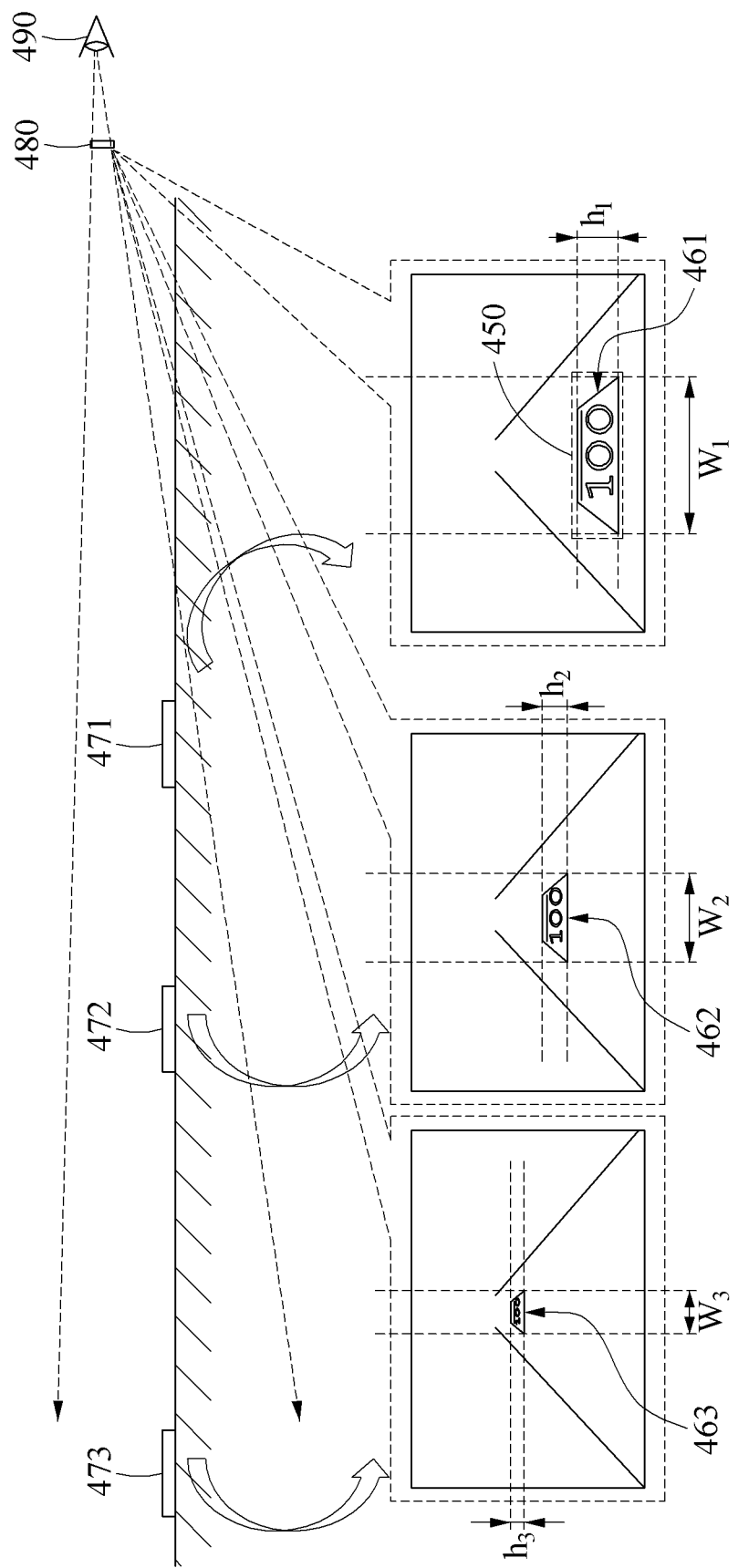
FIG. 4 illustrates an example of visualization of virtual content objects.

FIG. 4 illustrates an example of visualization of virtual content objects.

As described above, a user may observe a graphic object visualized through a projection plane 480. FIG. 4 illustrates an example of visualization of first, second, and third virtual content objects 471, 472, and 473 disposed in different distances from a user. Referring to FIG. 4, the first, second, and third virtual content objects 471, 472, and 473 may have the same shape and the same size. The first virtual content object 471 may be an object disposed at a first distance from the user. The second virtual content object 472 may be an object disposed at a second distance from the user. The third virtual content object 473 may be an object disposed at a third distance from the user. The third distance may be greater than the second distance, and the second distance may be greater than the first distance.

The first virtual content object 471 may be projected onto the projection plane 480 in a shape 461 having a width of $w_1$ and a height of $h_1$. The second virtual content object 472 may be projected onto the projection plane 480 in a shape 462 having a width of $w_2$ and a height of $h_2$. The third virtual content object 473 may be projected onto the projection plane 480 in a shape 463 having a width of $w_3$ and a height of $h_3$. When a distance between the user and a virtual content object increases, a shape of the virtual content object projected onto the projection plane 480 may be distorted due to an FOV defined by the projection plane 480 and a viewpoint 490 and a vanishing point included in a scene. Due to the above distortion caused by the vanishing point, delivery of information included in the virtual content object 471, 472, or 473 may be limited. In the example of FIG. 4, a height-to-width (h/w) ratio of a shape of each individual virtual content object 471, 472, and 473 projected onto the projection plane may satisfy $h_1/w_1 > h_2/w_2 > h_3/w_3$. In other words, when a distance between the viewpoint 490 and a virtual content object increases, the virtual content object may be flatly displayed on the projection plane in comparison to an intended size.

In this disclosure, a width of each virtual content object on the projection plane may be a width of a rectangular bounding box 450 that encloses a shape of a corresponding virtual content object projected onto the projection plane. For example, a width of a shape of a virtual content object projected onto the projection plane may be a distance (for example, a maximum horizontal distance of the shape) along a horizontal axis between a leftmost point and a rightmost point in the shape. The content visualizing apparatus may calculate a width of a virtual content object along a reference axis. Similarly, a height of each virtual content object on the projection plane may be a height of the rectangular bounding box 450 that encloses a shape of a corresponding virtual content object projected onto the projection plane. For example, a height of a shape of a virtual content object projected onto the projection plane may be a distance (for example, a maximum vertical distance of the shape) along a vertical axis between a top point and a bottom point in the shape. The content visualizing apparatus may calculate a height of a virtual content object on the projection plane based on a position of a proximal point closest to the viewpoint 490 on the projection plane and a position of a distal point farthest from the viewpoint 490 on the projection plane among points belonging to a space corresponding to the virtual content object.

Hereinafter, examples of content visualizing to prevent a decrease in visibility of a virtual content object, even though a distance between a user and the virtual content object increases, will be described.

Figure 5:
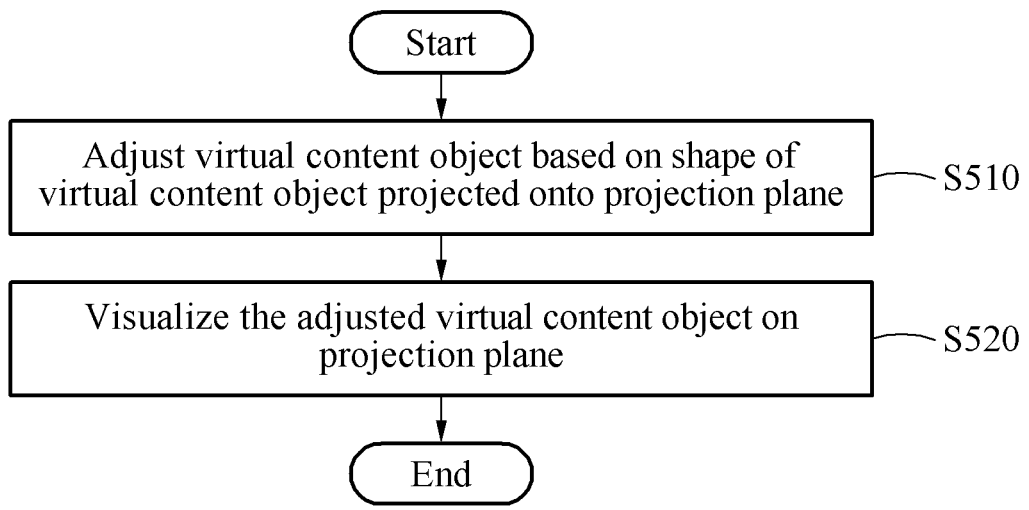
FIGS. 5 and 6 illustrate examples of a method with content visualizing.
Figure 6:
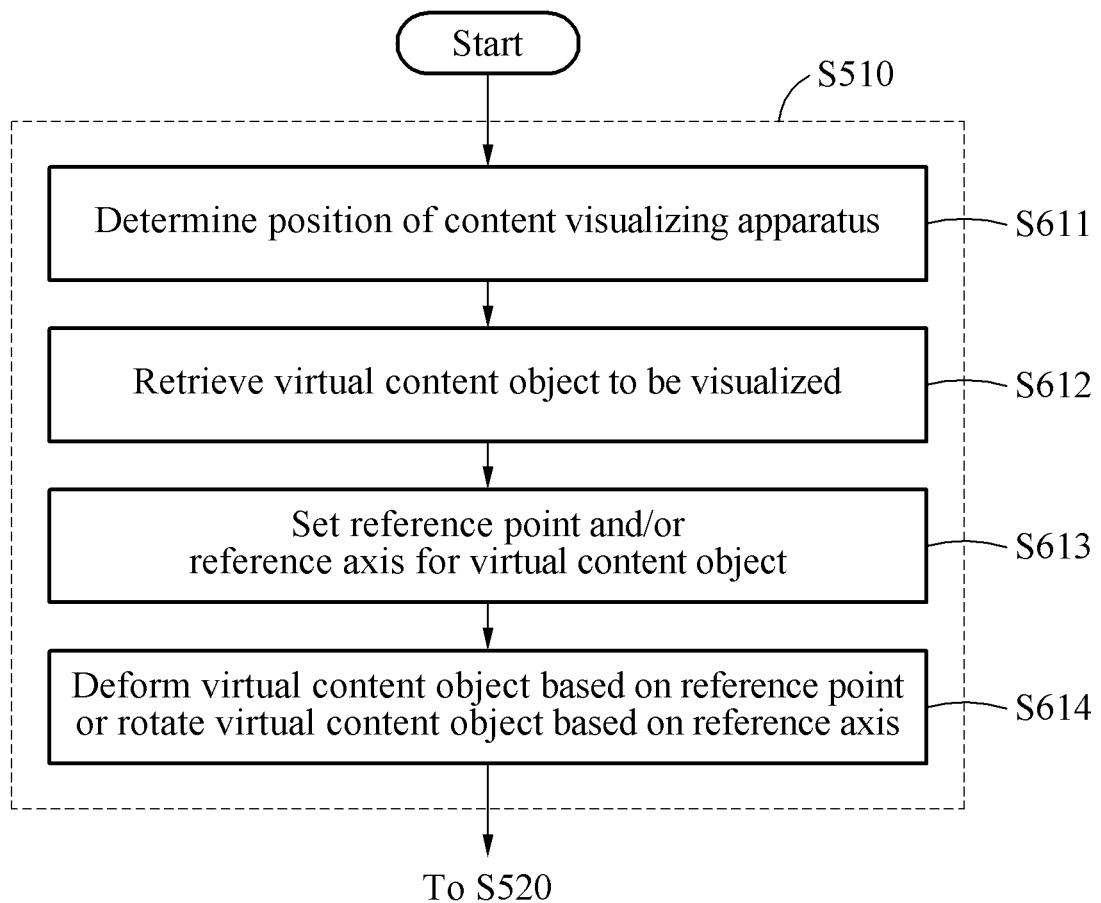

FIGS. 5 and 6 illustrate examples of content visualizing.

Referring to FIG. 5, in operation S510, a processor of a content visualizing apparatus adjusts a virtual content object based on a shape of the virtual content object projected onto a projection plane. In an example, the processor may set a reference point for the virtual content object and may deform the virtual content object based on the reference point. In another example, the processor may set a reference axis for the virtual content object and may rotate the virtual content object based on the reference axis. An example of deforming the virtual content object based on the reference point and rotating the virtual content object based on the reference axis will be further described below with reference to FIG. 6.

In an example, the processor may set a first reference point and a first reference axis for a first graphic object corresponding to a left image. The processor may adjust the first graphic object based on the first reference point and the first reference axis. Also, the processor may set a second reference point and a second reference axis for a second graphic object corresponding to a right image. The processor may adjust the second graphic object based on the second reference point and the second reference axis. The same scheme as those that will be described below with reference to FIGS. 6 through 14 may be applied to deformation and rotation of a virtual content object for each of a left image and a right image based on a reference point and a reference axis. For example, the first reference point and the first reference axis for the first graphic object corresponding to the left image may be set based on a left eye viewpoint. The second reference point and the second reference axis for the second graphic object corresponding to the right image may be set based on a right eye viewpoint. However, the disclosure is not limited to the foregoing examples, and the left eye viewpoint and the right eye viewpoint may also be determined as the same position (for example, a viewpoint corresponding to an eye box).

An operation of adjusting a virtual content object may be understood as an operation of adjusting a 3D shape of virtual content and an operation of adjusting a shape of the virtual content object projected onto a projection plane, unless contrary to the description.

Referring to FIG. 5, in operation S520, a display of a content visualizing apparatus visualizes the adjusted virtual content object on the projection plane. For example, the display may dispose a lower end portion of the virtual content object on a reference plane and may visualize the virtual content object. The reference plane may be a bottom surface of an object disposition space, for example, the ground. The processor may maintain the lower end portion of the virtual content object to be disposed above the reference plane, and accordingly the display may display the virtual content object so that the virtual content object may not overlap the reference plane. Thus, it is possible to prevent crosstalk from occurring due to overlapping between the virtual content object and the reference plane.

In an example, the display may provide the adjusted first graphic object to a left eye of a user and may provide the adjusted second graphic object to a right eye of the user. Thus, the content visualizing apparatus may visualize the virtual content object to maintain visibility for each individual viewpoint of the user (for example, a left eye viewpoint and a right eye viewpoint).

An example of deformation based on a reference point and rotation based on a reference axis is described below with reference to FIG. 6.

Referring to FIG. 6, in operation S611, a content visualizing apparatus determines a position of the content visualizing apparatus. For example, a sensor may collect information associated with the position of the content visualizing apparatus. The content visualizing apparatus may determine the position of the content visualizing apparatus based on the information (for example, GNSS information, acceleration information, speed information, or image information about a surrounding scene) associated with the position of the content visualizing apparatus.

In operation S612, the content visualizing apparatus retrieves a virtual content object that is to be visualized. For example, the content visualizing apparatus may acquire candidate objects around the content visualizing apparatus from a content DB based on the determined position. The content visualizing apparatus may load a candidate object by accessing the content DB, which is stored in an internal memory, or may receive a candidate object by accessing the content DB via an external server.

The content DB may include information about a plurality of virtual content objects. For example, the content DB may include position information and appearance information of each virtual content object. Appearance information of a virtual content object may include, for example, a shape and a size of the virtual content object as visualized. For example, when a virtual content object is a 3D graphic object, appearance information may include vertex information, edge information, texture information, mesh information, and polygon information. Position information of a virtual content object may include a physical position to which the virtual content object is mapped, and may include, for example, geographic coordinates. The physical position mapped to the virtual content object may be 3D coordinates including a height from the ground, in addition to 2D coordinates.

For example, the content visualizing apparatus may acquire, from the content DB, candidate objects mapped to physical positions within a threshold distance based on the determined position. The content visualizing apparatus may select a candidate object mapped to a physical position within an object disposition space, based on a currently determined position of the content visualizing apparatus from the candidate objects.

In operation S613, the content visualizing apparatus sets a reference point and/or a reference axis for the virtual content object. For example, the content visualizing apparatus may dispose the virtual content object in an object disposition space provided by a display, and may set at least one of the reference point and the reference axis based on a position relationship between the disposed virtual content object and a user.

The content visualizing apparatus may calculate a relative position of the retrieved virtual content object with respect to a current position of the user, based on a physical position of the retrieved virtual content object, and a position (for example, the position of the content visualizing apparatus), a viewpoint height, and a gaze direction of the user. The content visualizing apparatus may dispose the virtual content object in the object disposition space based on the calculated relative position. When the position of the user changes, the content visualizing apparatus may update a position of the virtual content object in the object disposition space based on the changed position of the user.

The content visualizing apparatus may set, as a reference point, one of points on an object along a direction axis that is parallel to a reference plane and that is oriented from the user toward a center of the virtual content object. The content visualizing apparatus may set a reference axis perpendicular to the direction axis, at the reference point. An example of setting the reference point and the reference axis will be further described below with reference to FIG. 12.

In operation S614, the content visualizing apparatus may deform the virtual content object based on the reference point, or rotate the virtual content object based on the reference axis. For example, the content visualizing apparatus may apply either one or both of deformation and rotation to the virtual content object, to prevent the virtual content object from being flatly visualized on a projection plane. Thus, the content visualizing apparatus may maximize visibility of a virtual content object located far away from the user.

FIGS. 7 through 10 illustrate examples of deformation of a virtual content object.

In an example, a content visualizing apparatus may deform a virtual content object based on a distance between a viewpoint 790 of a user and a physical position of the virtual content object. For example, the content visualizing apparatus may extend a shape of the virtual content object along a direction axis oriented from the user toward a reference point. The content visualizing apparatus may determine an extension length of the virtual content object based on a shape of the virtual content object projected onto a projection plane 780 or planes 781, 782 and 783 parallel to the projection plane 780. The extension length may be determined based on the distance between the viewpoint 790 and the physical position of the virtual content object. The content visualizing apparatus may adjust the extension length of the virtual content object, to maintain a visibility level at which a virtual content object disposed at a predesignated distance is observed in a view corresponding to a predesignated gaze direction axis, regardless of a distance between the user and the virtual content object. The visibility level may indicate, for example, a degree by which a shape representing information, for example, a picture, a letter, a number, or a symbol, is clearly discerned by a user.

In an example, when the distance between the viewpoint 790 and the physical position of the virtual content object decreases, the content visualizing apparatus may reduce a length of the virtual content object along a direction axis 796 that is parallel to the reference plane 760 and that is oriented from the user toward a reference point. In another example, when the distance between the viewpoint 790 and the physical position of the virtual content object increases, the content visualizing apparatus may increase the length of the virtual content object along the direction axis 796.

Figure 7:
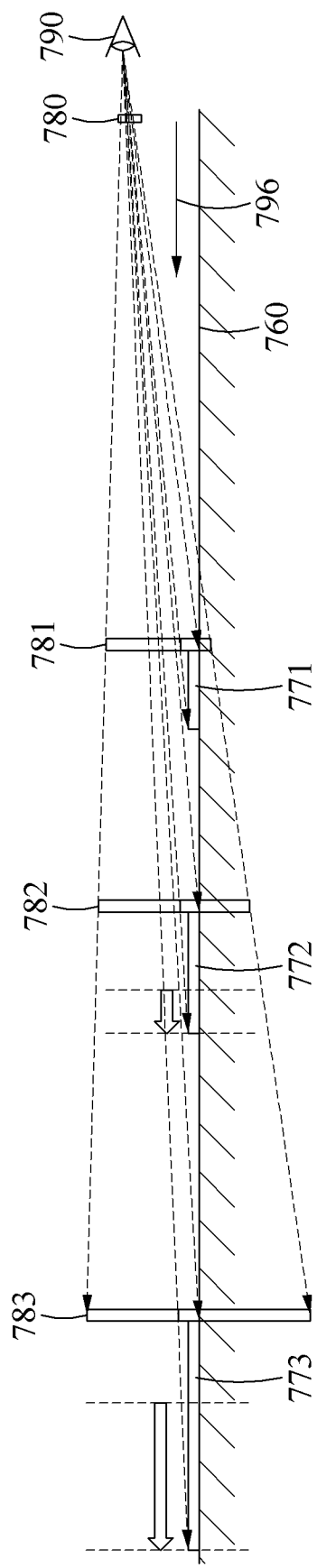
FIGS. 7 through 10 illustrate examples of deformation of a virtual content object.

In FIG. 7, a first virtual content object 771 may be an object disposed at a first distance from the user. A second virtual content object 772 may be an object disposed at a second distance from the user. A third virtual content object 773 may be an object disposed at a third distance from the user. The third distance may be greater than the second distance, and the second distance may be greater than the first distance. The first distance through the third distance may be the same as those of FIG. 4. As shown in FIG. 7, the second virtual content object 772 disposed at the second distance and the third virtual content object 773 disposed at the third distance may have a shape extended from the first virtual content object 771 along the direction axis 796. Visualization of the first virtual content object 771 that is a criterion for a target visibility level to be provided to the user will be described below with reference to FIG. 8. The second virtual content object 772 and the third virtual content object 773 having a shape extended along a reference axis parallel to the reference plane 760 to maintain the target visibility level will be described below with reference to FIGS. 9 and 10. The second virtual content object 772 and the third virtual content object 773 may have shapes of the deformed first virtual content object 771. The first virtual content object 771, the second virtual content object 772, and the third virtual content object 773 may be, for example, route guidance information, and may indicate speed limit information (for example, a speed limit to below 100 kilometers per hour (km/h)).

Figure 8:
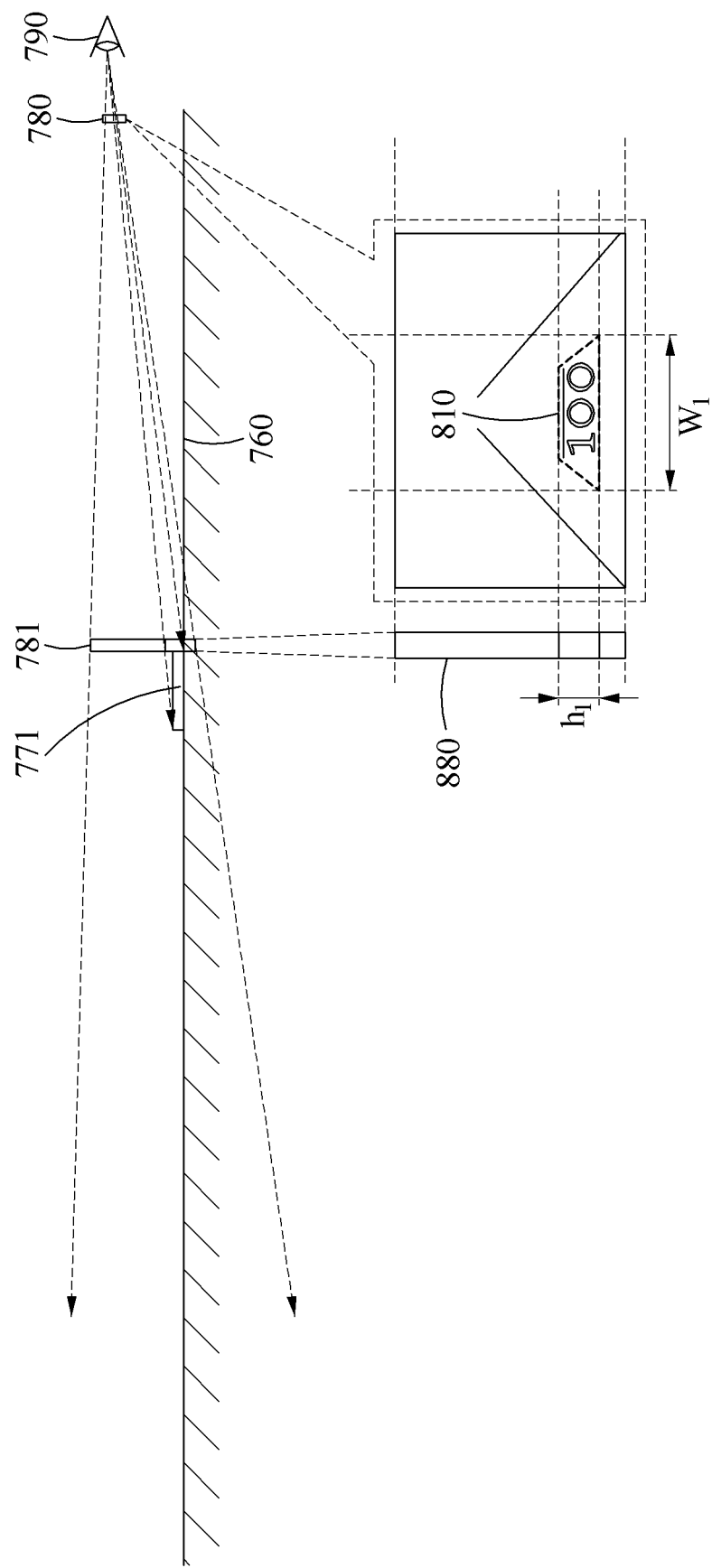

FIG. 8 illustrates an example of the visualization of the first virtual content object 771 matching the first distance from the user. For example, the content visualizing apparatus may output a graphic object 810 representing a shape of the first virtual content object 771 projected onto the projection plane 780. The plane 781 parallel to the projection plane 780 at a reference point of the first virtual content object 771 may be a plane in which the projection plane 780 is enlarged along an FOV. A side surface 880 of the plane 781 may have the same size as that of the projection plane 780, and may be scaled and represented as shown in FIG. 8. The first virtual content object 771 projected onto the projection plane 780 may have a height of $h_1$ and a width of $w_1$. The content visualizing apparatus may maintain an h/w ratio of the graphic object 810 on the projection plane 780 at all distances. The content visualizing apparatus may provide a visibility level for observation of the first virtual content object 771 at the first distance, even at various distances, by maintaining the h/w ratio of the graphic object 810 on the projection plane 780.

In an example, the content visualizing apparatus may change a virtual content object based on the h/w ratio of the graphic object 810 on the projection plane 780. For example, the content visualizing apparatus may determine a target ratio designated for a reference distance (for example, 3 m). In FIG. 8, the content visualizing apparatus may determine the first distance as a reference distance, and may determine, as a target ratio, the h/w ratio of the graphic object 810 representing the shape of the first virtual content object 771 visualized at the reference distance and projected onto the projection plane 780. The target ratio may be maintained for the second virtual content object 772 and the third virtual content object 773 in the following description provided with reference to FIGS. 9 and 10.

Figure 9:
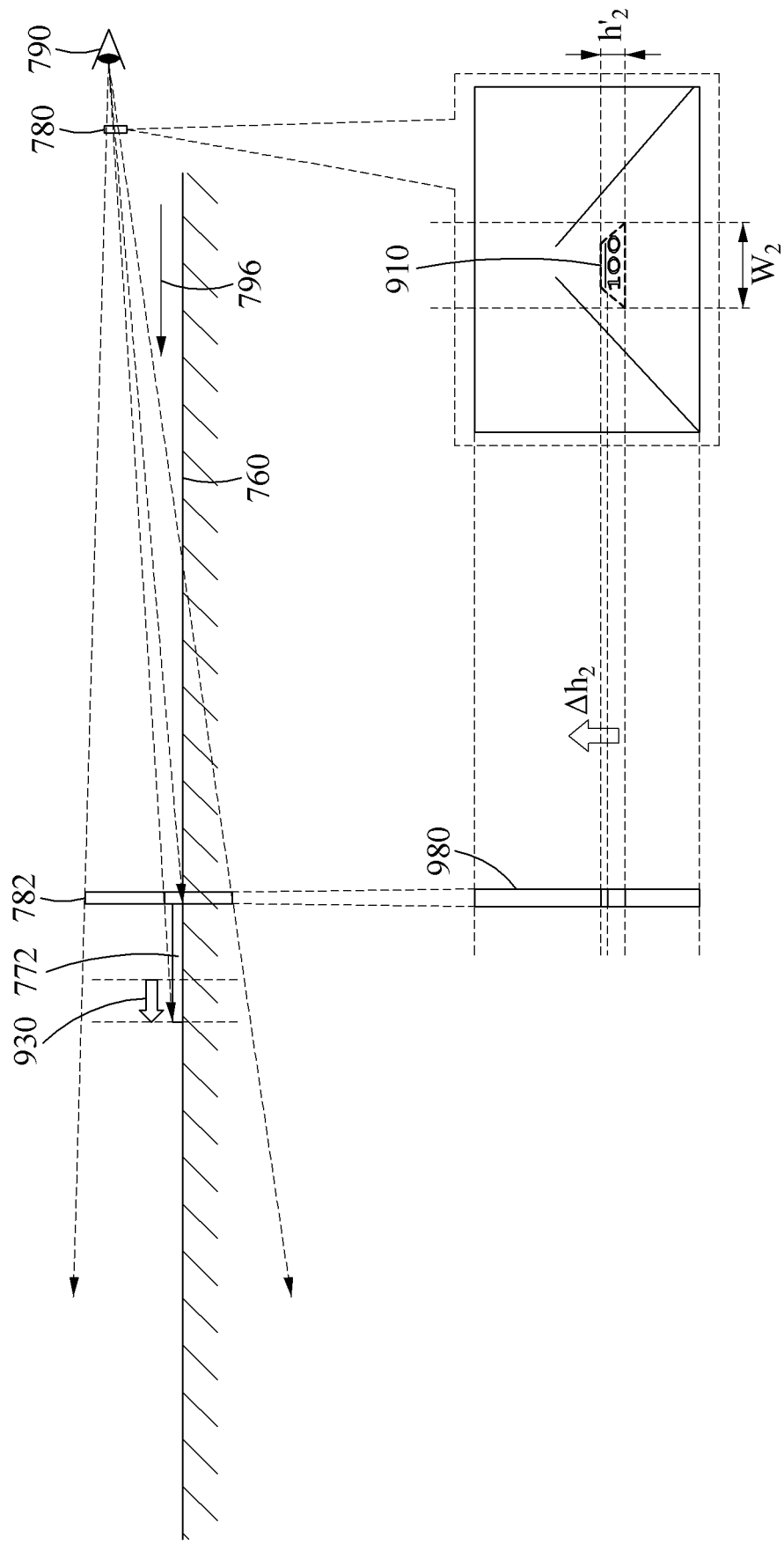

Referring to FIG. 9, the content visualizing apparatus may extend a length 930 along the direction axis 796 of the virtual content object. The content visualizing apparatus may fit an h/w ratio of a shape of a projected virtual content object to a target ratio designated for a reference distance. For example, the content visualizing apparatus may fit an $h'_2/w_2$ ratio of a second graphic object 910 representing a shape of the second virtual content object 772 projected onto the projection plane 780. When the second virtual content object 772 with a height of $h_2$ disposed at the second distance is projected onto the projection plane 780, as shown in FIG. 7, the content visualizing apparatus may increase a height of the second graphic object 910 by $\Delta h_2$. In other words, the content visualizing apparatus may increase the height of $h'_2$ in a side surface 980 of the projection plane 780 and the projection plane 780 by extending a length 930 along the direction axis 796.

Figure 10:
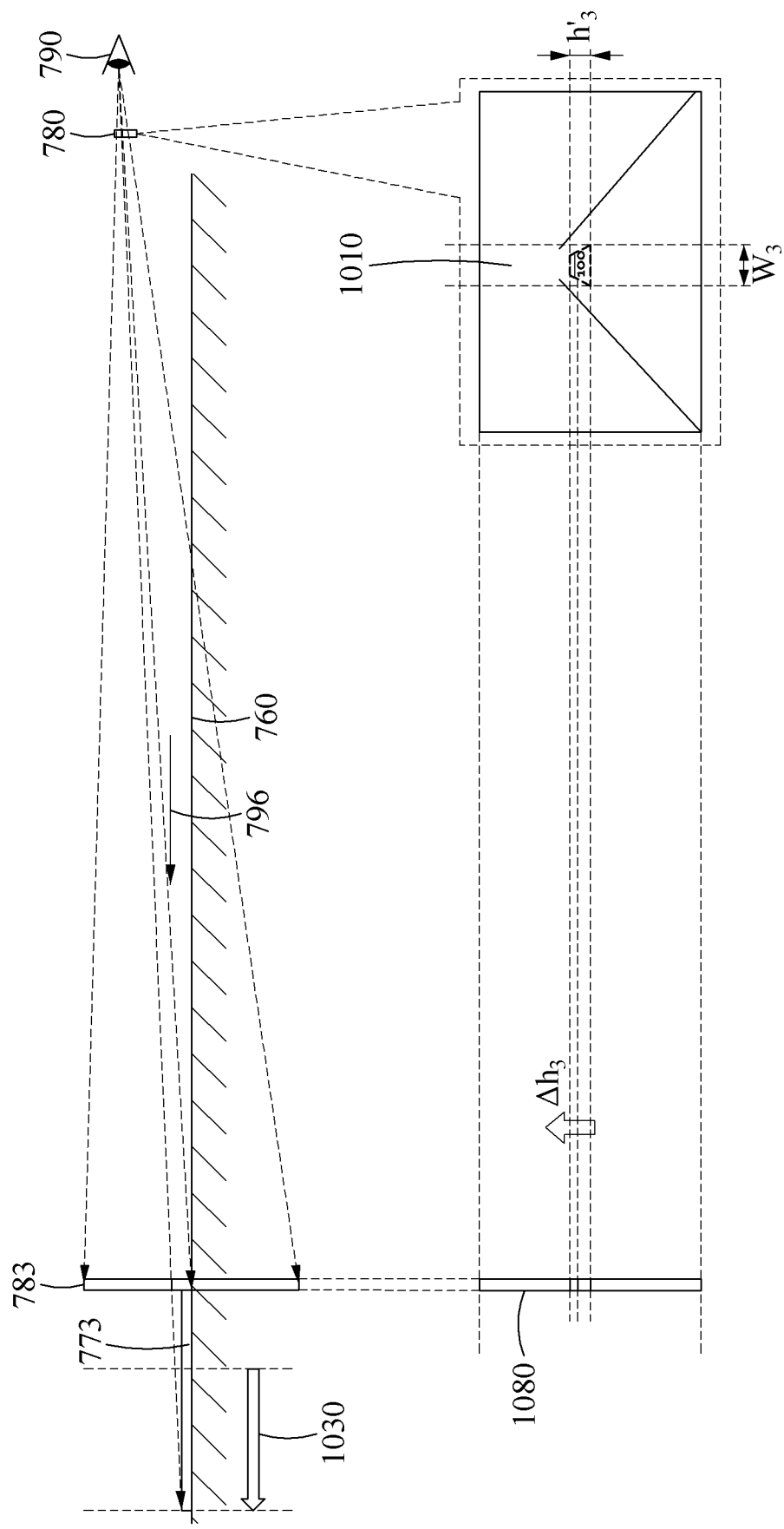

Referring to FIG. 10, similarly to FIG. 9, the content visualizing apparatus may extend a length 1030 along the direction axis 796 of virtual content based on the target ratio. For example, the content visualizing apparatus may fit an $h'_3/w_3$ ratio of a third graphic object 1010 representing a shape of the third virtual content object 773 projected onto the projection plane 780 to an $h_1/w_1$ ratio that is a target ratio. When the third virtual content object 773 with a height of $h_3$ disposed at the third distance is projected onto the projection plane 780, as shown in FIG. 7, the content visualizing apparatus may increase a height of the third graphic object 1010 by $\Delta h_3$. In other words, the content visualizing apparatus may increase the height of $h'_3$ in a side surface 1080 of the projection plane 780 and the projection plane 780 by extending the length 1030 along the direction axis 796.

The visibility level may depend on a gaze axis angle at which an object is observed, as well as a distance. The gaze axis angle may be an angle formed between a gaze direction axis and the reference plane 760. For example, when the first virtual content object 771 viewed at a first gaze axis angle and the first distance has the $h_1/w_1$ ratio, and when the above-described $h_1/w_1$ ratio is maintained for the second virtual content object 772 and the third virtual content object 773 as described above, the same visibility level as if the second virtual content object 772 and the third virtual content object 773 are observed at the first distance (for example, 3 m) and the first gaze axis angle (for example, 20 degrees in a downward direction) may be provided. Thus, even though a size of output virtual content decreases when the distance increases, a distortion caused by a vanishing point may be minimized.

Also, an h/w ratio of a graphic object representing a shape of virtual content projected onto a projection plane may be selected by a user. For example, during an initialization operation, the content visualizing apparatus may visualize preliminary graphic objects for calibration at various angles and various distances to a user. The content visualizing apparatus may apply an h/w ratio of a preliminary graphic object selected by a user on the projection plane to the other preliminary graphic objects.

Figure 11:
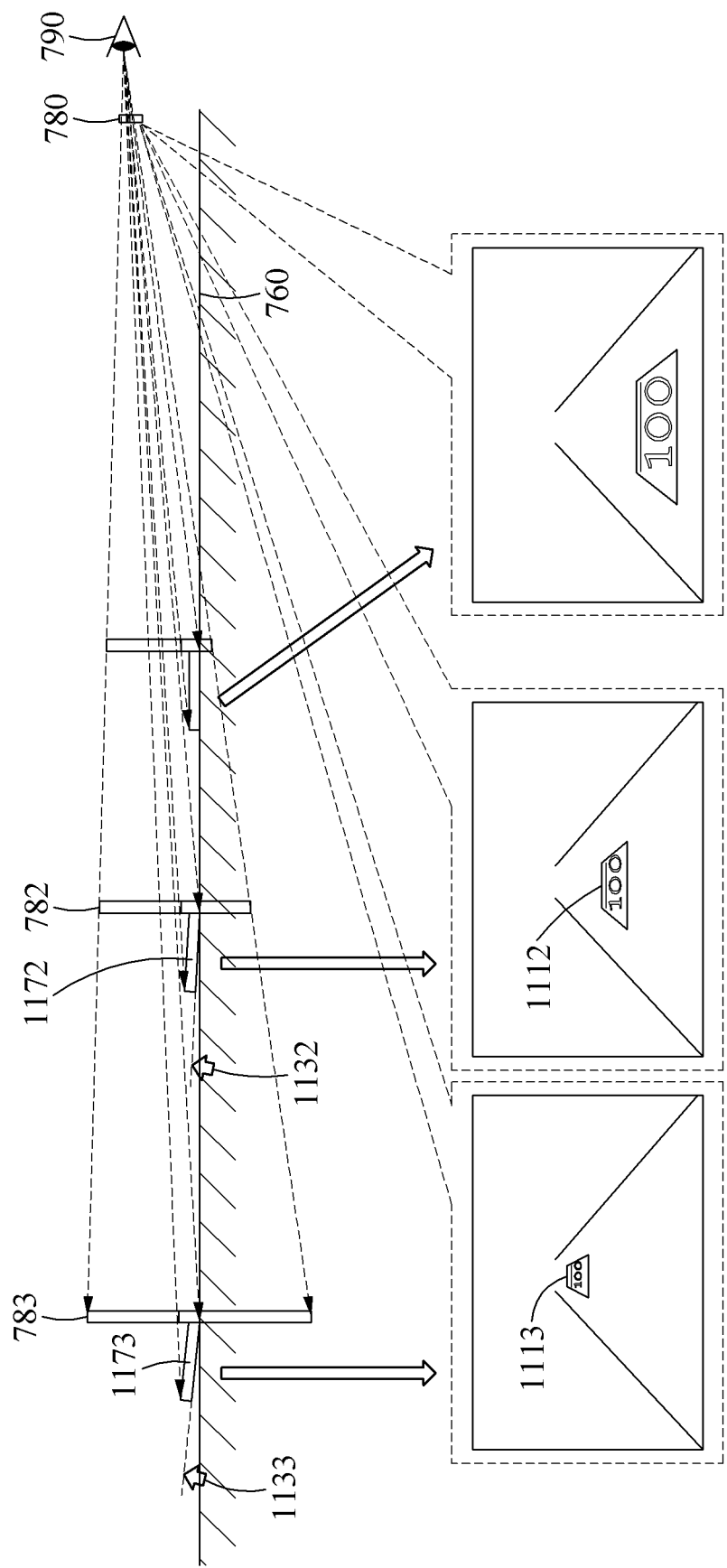
FIG. 11 illustrates an example of rotation of a virtual content object.

FIG. 11 illustrates an example of rotation of a virtual content object.

In an example, a content visualizing apparatus may rotate a virtual content object based on a reference axis. The content visualizing apparatus may rotate the virtual content object so that the virtual content object may stand on the reference plane 760 (for example, the ground). For example, when a distance between a viewpoint of a user and a physical position of a virtual content object decreases, the content visualizing apparatus may reduce an angle between the reference plane 760 and a bottom surface of the virtual content object based on the reference axis. When the distance between the viewpoint of the user and the physical position of the virtual content object increases, the content visualizing apparatus may increase the angle between the reference plane 760 and the bottom surface of the virtual content object based on the reference axis. The content visualizing apparatus may adjust the angle between the reference plane 760 and the bottom surface of the virtual content object so that an h/w ratio of a graphic object representing a shape of the virtual content object projected onto a projection plane may be fitted to a target ratio.

As shown in FIG. 11, a second virtual content object 1172 disposed at a second distance may be rotated by a first angle 1132. A third virtual content object 1173 disposed at a third distance may be rotated by a second angle 1133. The second angle 1133 may be greater than the first angle 1132. A second graphic object 1112 obtained by projecting the second virtual content object 1172 and a third graphic object 1113 obtained by projecting the third virtual content object 1173 may have a shape fitted to the target ratio.

Figure 12:
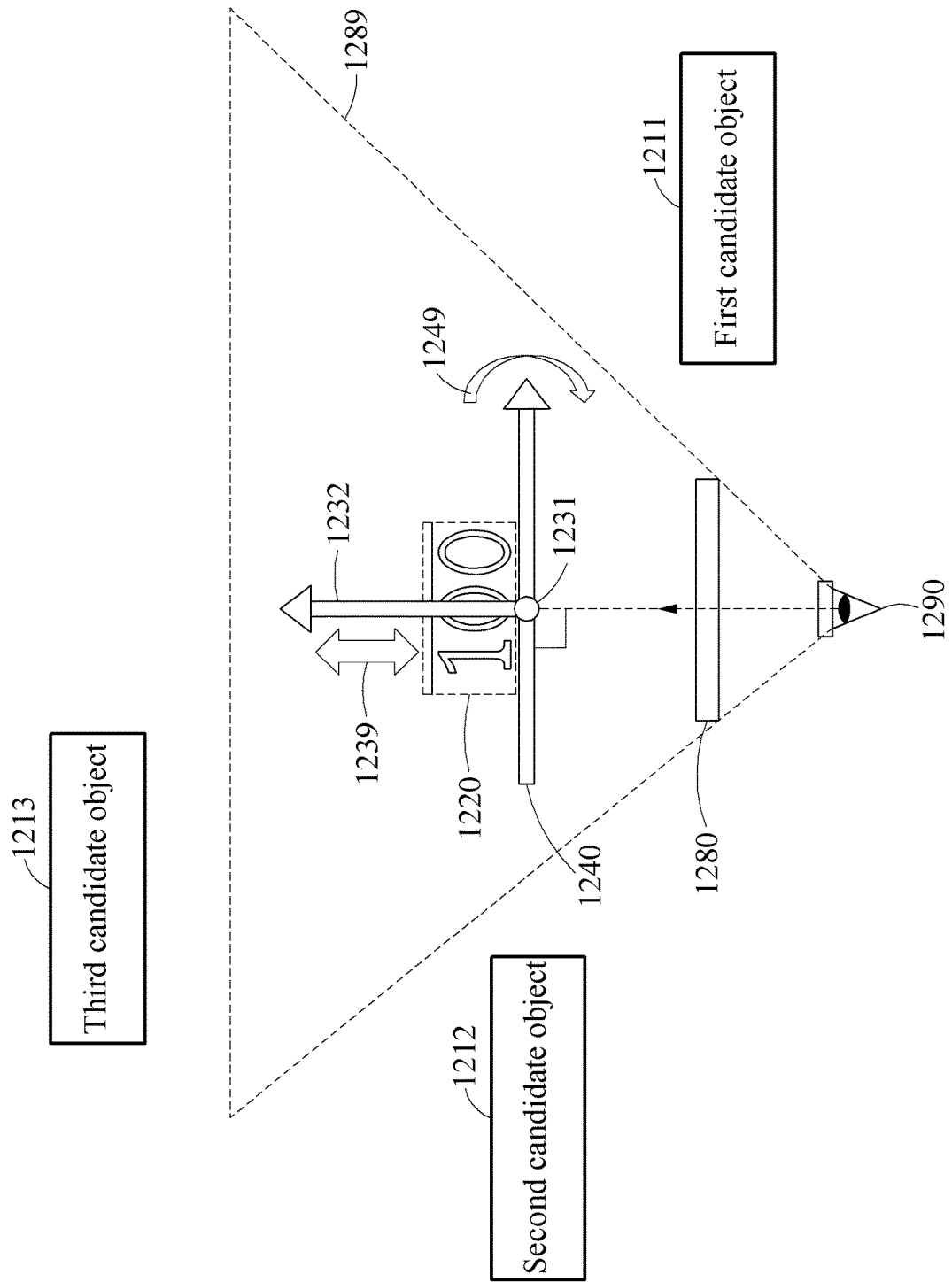
FIGS. 12 and 13 illustrate examples of setting of a reference point and a reference axis on a virtual content object.
Figure 13:
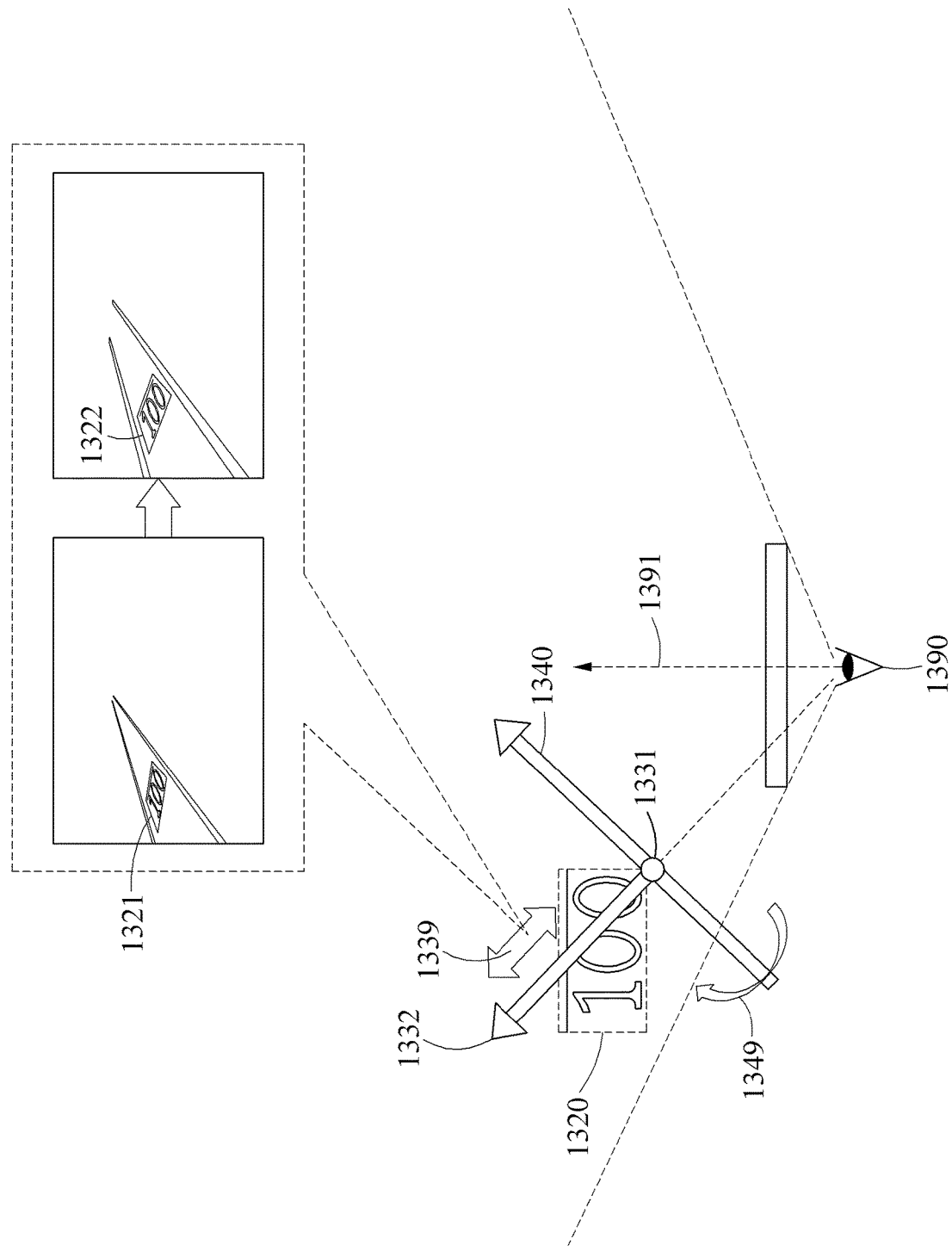

FIGS. 12 and 13 illustrate examples of setting a reference point and a reference axis for a virtual content object.

As described above, a content visualizing apparatus may retrieve a virtual content object 1220 located in an object disposition space 1289 among a plurality of candidate objects, for example, a first candidate object 1211, a second candidate object 1212, and a third candidate object 1213, from a content DB. For example, when the content visualizing apparatus is mounted on a vehicle, or implemented as the vehicle itself, the content visualizing apparatus may determine a virtual content object to be provided to a user based on a position of the vehicle. Although a single virtual content object, that is, the virtual content object 1220 is illustrated, the disclosure is not limited to this example. For example, a plurality of virtual content objects 1220 may be present in the object disposition space 1289. As described above, the object disposition space 1289 may be determined based on, for example, a projection plane 1280 and an FOV of a viewpoint 1290 of the user.

In an example, the content visualizing apparatus may set one of points belonging to a space corresponding to the virtual content object 1220 as a reference point 1231. The content visualizing apparatus may change the virtual content object 1220 based on the reference point 1231.

The content visualizing apparatus may determine one of points at which a direction axis parallel to a reference plane and oriented from the user toward the virtual content object 1220 passes through the virtual content object 1220, as the reference point 1231. For example, the content visualizing apparatus may select one of the points belonging to the space corresponding to the virtual content object 1220 based on a distance between the viewpoint 1290 and physical positions of the points. The content visualizing apparatus may determine a point closest to the viewpoint 1290 among the points as the reference point 1231. However, the disclosure is not limited to this example, and the reference point 1231 may also be set as a point, for example, a central point, in a space occupied by the virtual content object 1220.

Also, the content visualizing apparatus may set a reference axis 1240 perpendicular to a direction axis oriented from the user toward the reference point 1231, at the reference point 1231. For example, a shortest distance to the virtual content object 1220 may need to be set as the reference point 1231 and the reference axis 1240 may need to be set based on the reference point 1231, to prevent crosstalk with the reference plane from occurring during rotation of the virtual content object 1220.

The content visualizing apparatus may apply, to the virtual content object 1220, extension 1239 along a direction axis 1232 parallel to the reference plane and oriented from the viewpoint 1290 toward the virtual content object 1220, in a gaze direction from the reference point 1231. The content visualizing apparatus may apply rotation 1249 based on the reference axis 1240 to the virtual content object 1220.

Although an example in which a virtual content object is located in front of a viewpoint has been described above with reference to FIG. 12, the above description is similarly applicable to a virtual content object 1320 disposed obliquely to a gaze central axis 1391 of a viewpoint 1390, as shown in FIG. 13. For example, the content visualizing apparatus may set, as a reference point 1331, a point at a shortest distance between the viewpoint 1390 and the virtual content object 1320. The content visualizing apparatus may set a reference axis 1340 perpendicular to a direction axis 1332 parallel to a reference plane and oriented from the viewpoint 1390 toward the reference point 1331, at the reference point 1331. The content visualizing apparatus may apply, to the virtual content object 1320, either one or both of extension 1339 based on the reference point 1331 and the direction axis 1332, and rotation 1349 based on the reference axis 1340. Accordingly, a graphic object 1321 on a projection plane corresponding to the virtual content object 1320 may be adjusted to a graphic object 1322 with enhanced visibility. Thus, it is possible to minimize a distortion during scale adjustment even though the gaze central axis 1391 does not face an object.

Figure 14:
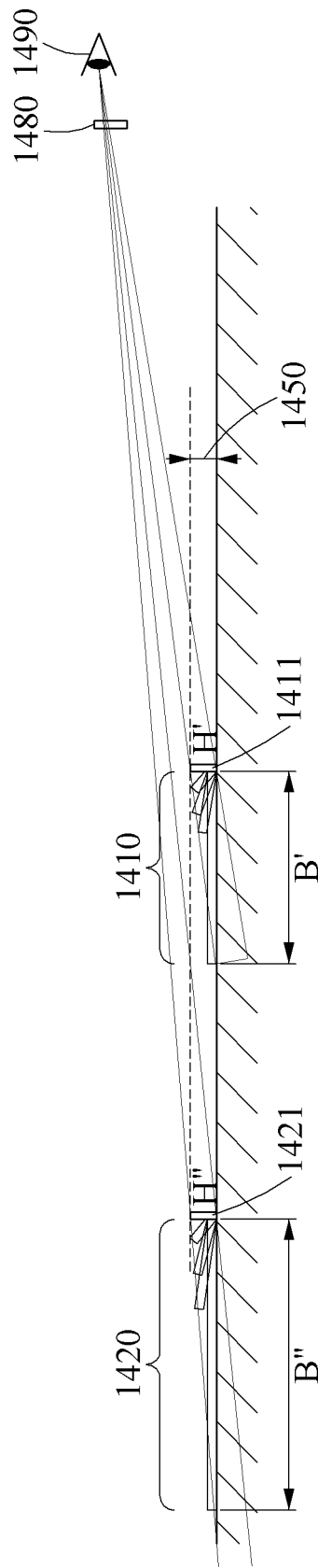
FIG. 14 illustrates an example of various deformations of a virtual content object.

FIG. 14 illustrates an example of various deformations of a virtual content object.

In an example, when a movement of a viewpoint 1490 of a user is detected, a content visualizing apparatus may change a shape of a virtual content object. For example, the content visualizing apparatus may apply either one or both of deformation based on a reference point and rotation based on a reference axis to the virtual content object.

For example, when heights H' and H" of shapes of a virtual content object projected onto virtual planes, for example, a first plane 1411 and a second plane 1421, that are parallel to a projection plane 1480 are the same, the above-described target ratio may be maintained. The first plane 1411 and the second plane 1421 may be disposed in positions at which pieces of virtual content are disposed, respectively. For example, the height H' of a shape of a first virtual content object 1410 projected onto the first plane 1411 at a first distance, and the height H" of a shape of a second virtual content object 1420 projected onto the second plane 1421 at a second distance may be maintained to be the same. In this example, a width of the first virtual content object 1410 at the first distance and a width of the second virtual content object 1420 at the second distance may be the same as W. Thus, when heights 1450 of the first plane 1411 and the second plane 1421 parallel to the projection plane 1480 are the same, as described above, the target ratio described above with reference to FIGS. 1 through 13 may be maintained.

Thus, the content visualizing apparatus may determine a length B' of the first virtual content object 1410 and a length B" of the second virtual content object 1420 along a reference plane, based on the viewpoint 1490, the projection plane 1480, and the heights 1450. For example, when a bottom surface of a virtual content object is parallel to the reference plane, the content visualizing apparatus may extend virtual content objects to respective maximum lengths B' and B". Also, the content visualizing apparatus may determine an extension length and an angle of rotation of a virtual content object, based on the viewpoint 1490, the projection plane 1480, and the heights 1450.

The processors 230 and 312, the memory 240, the picture generator 314, the processors, and the memories in FIGS. 1-14 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-14 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented method, comprising:
determining an adjustment of a virtual content object, for projection onto a projection plane, based on a shape to be projected of the virtual content object;
generating an adjusted virtual content object by adjusting the virtual content object based on the determined adjustment; and
visualizing the adjusted virtual content object on the projection plane,
wherein the shape to be projected is dependent on a physical depth represented by a reference element in a virtual space used for the adjusting of the virtual content object, and
wherein the adjusting of the virtual content object is performed based on information regarding the reference element, within the virtual space, separated from positions of the adjusted virtual content object as represented in the virtual space.

2. The method of claim 1, wherein the adjusting of the virtual contact object comprises:
setting one of points in the virtual space corresponding to the virtual content object as a reference point; and
changing the virtual content object based on the set reference point.

3. The method of claim 2, wherein the changing of the virtual content object includes changing of a current shape of the virtual content object by extending the current shape of the virtual content object along a direction axis oriented from a user toward the reference point.

4. The method of claim 2, wherein the changing of the virtual content object includes changing a current shape of the virtual content object, comprising:

setting a reference axis, perpendicular to a direction axis oriented from a user toward the reference point, including the reference point; and rotating the virtual content object based on the reference axis.

5. The method of claim 2, wherein the setting of the one of the points as the reference point comprises determining one of the points at which a direction axis parallel to a reference plane, in the virtual space, and oriented from a user toward the virtual content object passes through the virtual content object as the reference point.

6. The method of claim 2, wherein the setting of the one of the points as the reference point comprises selecting the one of the points based on a distance between a viewpoint of a user and physical positions of the points.

7. The method of claim 6, wherein the selecting of the one of the points comprises determining a point closest to the viewpoint of the user among the points as the reference point.

8. The method of claim 1, wherein the adjusting of the virtual content object comprises changing a height-to-width (h/w) ratio of the virtual content object based on a height-to-width (h/w) ratio of the shape of the virtual content object projected onto the projection plane.

9. The method of claim 1, wherein the visualizing of the adjusted virtual content object comprises disposing a lower end portion of the virtual content object on a reference plane and visualizing the virtual content object with the lower end portion disposed on the reference plane.

10. The method of claim 9, wherein the reference plane corresponds to a bottom surface of the virtual space in which the virtual content object is visualized.

11. The method of claim 1, wherein the adjusting of the virtual content object comprises:

setting a first reference point and a first reference axis in a first graphic object corresponding to a left image;

adjusting the first graphic object based on the first reference point and the first reference axis;

setting a second reference point and a second reference axis in a second graphic object corresponding to a right image; and adjusting the second graphic object based on the second reference point and the second reference axis.

12. The method of claim 11, wherein the visualizing of the adjusted virtual content object comprises providing the adjusted first reference point to a left eye of a user and providing the adjusted second reference point to a right eye of the user.

13. The method of claim 11, wherein the visualizing of the adjusted virtual content object comprises differently visualizing the adjusted first graphic object and the adjusted second graphic object on the projection plane based on a binocular disparity.

14. The method of claim 1, wherein the adjusting of the virtual content object comprises changing the shape of the virtual content object in response to a movement of a viewpoint of a user being detected.

15. The method of claim 1, wherein the adjusting of the virtual content object comprises:

reducing a length of the virtual content object along a direction axis parallel to a reference plane and oriented from a user toward a reference point, in response to a distance between a viewpoint of the user and a physical position of the virtual content object decreasing; or increasing the length of the virtual content object along the direction axis parallel to the reference plane and oriented from the user toward the reference point, in response to the distance between the viewpoint of the user and the physical position of the virtual content object increasing.

16. The method of claim 1, wherein the adjusting of the virtual content object comprises:

reducing an angle between a reference plane and a bottom surface of the virtual content object based on a reference axis, in response to a distance between a viewpoint of a user and a physical position of the virtual content object decreasing; or increasing the angle between the reference plane and the bottom surface of the virtual content object based on the reference axis, in response to the distance between the viewpoint of the user and the physical position of the virtual content object increasing.

17. The method of claim 1, wherein the visualizing of the adjusted virtual content object comprises overlaying the adjusted virtual content object over a physical environment outside of the apparatus by visualizing the adjusted virtual content object using a display of an augmented reality (AR) glasses apparatus.

18. The method of claim 1, wherein the visualizing of the adjusted virtual content object comprises visualizing the adjusted virtual content object, using a head-up display (HUD) of a vehicle.

19. A non-transitory computer-readable storage medium storing instructions that, when executed by a processor, cause the processor to perform the method of claim 1.

20. The method of claim 1, further comprising:

projecting the adjusted virtual content object on the projection plane.

21. A processor-implemented method, comprising:

determining an adjustment of a virtual content object, for projection onto a projection plane, based on a shape to be projected of the virtual content object;

adjusting the virtual content object based on the determined adjustment; and visualizing the adjusted virtual content object on the projection plane, wherein the adjusting of the virtual contact object comprises:

setting one of points belonging to a space corresponding to the virtual content object as a reference point; and changing the virtual content object based on the set reference point, and wherein the setting of the one of the points as the reference point comprises selecting the one of the points based on a distance between a viewpoint of a user and physical positions of the points.

22. The method of claim 21, wherein the selecting of the one of the points comprises determining a point closest to the viewpoint of the user among the points as the reference point.

23. A processor-implemented method, comprising:

adjusting a virtual content object based on a shape of the virtual content object projected onto a projection plane; and visualizing the adjusted virtual content object on the projection plane, wherein the adjusting of the virtual content object comprises changing the virtual content object based on a height-to-width (h/w) ratio of the shape of the virtual content object projected onto the projection plane, and wherein the changing of the virtual content object comprises fitting the h/w ratio to a target ratio designated for a reference distance.

24. The method of claim 23, wherein the changing of the virtual content object comprises:
- calculating a height of the virtual content object based on a position of a proximal point closest to a viewpoint on the projection plane and a position of a distal point farthest from the viewpoint on the projection plane among points belonging to a space corresponding to the virtual content object; and
- calculating a width of the virtual content object along a reference axis.

25. An apparatus with content visualizing, comprising:
- a processor configured to generate an adjusted virtual content object by performing an adjustment, before the adjusted virtual content object is visualized on a projection plane, on a corresponding virtual content object based on a shape of to be projected of the corresponding virtual content object as if the corresponding virtual content object is being projected on the projection plane; and
- a display configured to visualize the adjusted virtual content object on the projection plane and projecting the adjusted virtual content object on the projection plane,
- wherein the shape to be projected is dependent on a physical depth represented by a reference element in a virtual space used for the adjusting of the virtual content object,
- wherein the processor is further configured to retrieve the virtual content object from among a plurality of candidate objects stored in memory, other than a memory storing the virtual content object projected onto the projection plane, based on a position of the apparatus or based on the projection plane and a field of view of a viewpoint of a user of the apparatus.

26. The apparatus of claim 25, wherein the display is an augmented reality (AR) glasses display.

27. The apparatus of claim 26, wherein
the display is a transparent display configured to provide the adjusted virtual content object by overlaying the adjusted virtual content object over a physical environment outside of the apparatus while visualizing the adjusted virtual content object using the projection plane.

28. The apparatus of claim 25, wherein the display is a head-up display (HUD) of a vehicle.

29. The apparatus of claim 25, wherein the adjustment of the virtual content object is performed based on information regarding the reference element, within the virtual space, separated from positions of the adjusted virtual content object as represented in the virtual space.

30. An apparatus, comprising:
- a processor configured to:
  - select a virtual content object, from among previously adjusted one or more objects in a virtual space corresponding a current projection of the previously adjusted one or more objects projected on a projection plane visualizing the previously adjusted one or more objects within a physical environment outside of the apparatus; and
  - adjust the selected virtual content object based on a shape of the selected virtual content object; and
- a display configured to visualize the adjusted virtual content object within the physical environment outside of the apparatus, by projecting the adjusted virtual content object on the projection plane,
- wherein the shape of the selected virtual content object is dependent on a physical depth represented by a reference element in a virtual space used for the adjusting of the selected virtual content object,
- wherein the adjustment of the selected virtual content object is performed based on information regarding the reference element, within the virtual space, separated from positions of the adjusted virtual content object as represented in the virtual space.

* * * * *